(12) United States Patent
Kida et al.

(10) Patent No.: US 6,537,697 B2
(45) Date of Patent: Mar. 25, 2003

(54) LITHIUM SECONDARY BATTERY

(75) Inventors: Yoshinori Kida, Hirakata (JP);
Katsunori Yanagida, Itami (JP);
Atsushi Yanai, Yono (JP); Atsuhiro Funahashi, Suita (JP); Toshiyuki Nohma, Hirakata (JP); Ikuo Yonezu, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 72 days.

(21) Appl. No.: 09/737,936

(22) Filed: Dec. 18, 2000

(65) Prior Publication Data

US 2001/0018152 A1 Aug. 30, 2001

(30) Foreign Application Priority Data

Dec. 22, 1999 (JP) .............................. 11-363692

(51) Int. Cl.[7] .............................................. H01M 10/40
(52) U.S. Cl. ...................... 429/199; 429/307; 252/62.2
(58) Field of Search ...................... 252/62.2; 429/307, 429/199

(56) References Cited

FOREIGN PATENT DOCUMENTS

JP          A817468         1/1996

*Primary Examiner*—Carol Chaney
(74) *Attorney, Agent, or Firm*—Birch, Stewart, Kolasch & Birch, LLP

(57) ABSTRACT

The lithium secondary battery of this invention uses a nonaqueous electrolyte including lithium tetrakis (pentafluorophenyl)borate as a part or whole of an electrolytic salt. As a result, the lithium secondary battery exhibits better charge-discharge cycle performance than a lithium secondary battery using a conventional lithium salt as the electrolytic salt.

13 Claims, 1 Drawing Sheet

A 1

Figure
A1
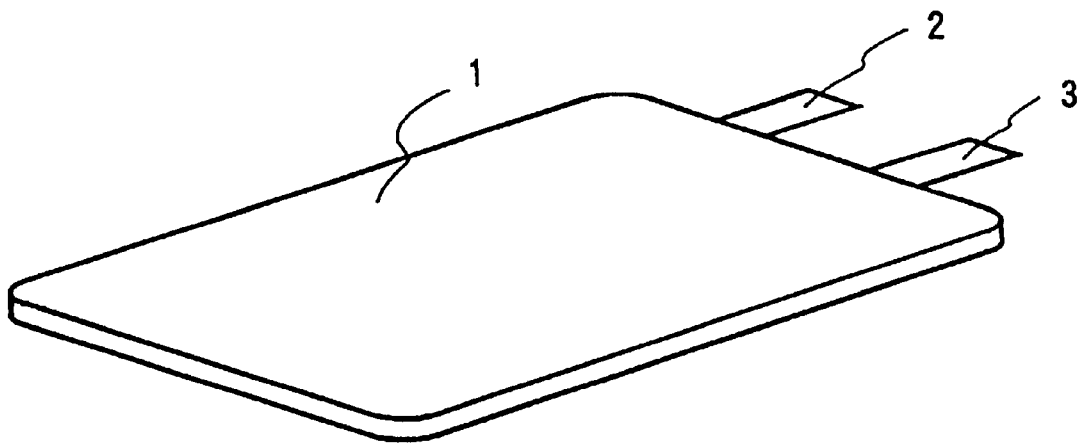

LITHIUM SECONDARY BATTERY

BACKGROUND OF THE INVENTION

This application claims the Paris convention priority of Japanese Patent Application No. 11-363692/1999 filed on Dec. 22, 1999, which is incorporated herein by reference.

The present invention relates to a lithium secondary battery using a nonaqueous electrolyte including an electrolytic salt dissolved in a nonaqueous solvent, and more particularly, it relates to improvement of a nonaqueous electrolyte for the purpose of providing a lithium secondary battery exhibiting better charge-discharge cycle performance than a lithium secondary battery using a conventional nonaqueous electrolyte.

A conventional water reactive lithium secondary battery uses, as an electrolyte, a nonaqueous electrolyte including an electrolytic salt dissolved in a nonaqueous solvent.

Examples of the conventionally used nonaqueous solvent are ethylene carbonate, propylene carbonate, dimethyl carbonate, diethyl carbonate, ethylmethyl carbonate, 1,2-dimethoxyethane and a mixed solvent including any of these solvents. An example of the conventionally used electrolytic salt is a lithium salt such as $LiPF_6$, $LiBF_4$, $LiCF_3SO_3$, $LiN(CF_3SO_2)_2$ or $LiN(C_2F_5SO_2)_2$.

In order to improve the characteristics, such as the charge-discharge cycle performance in particular, of a lithium secondary battery, a variety of improvements have been proposed with respect to not only a positive electrode active material and a negative electrode active material but also a nonaqueous electrolyte.

For example, it has been reported that the charge-discharge cycle performance can be improved by using both $LIPF_6$ and $LIBF_4$ as the electrolytic salt of the nonaqueous electrolyte in a lithium secondary battery using $Li_xMO_2$ (wherein M is one or more transition metals; and $0.05 \leq x \leq 1.10$) as the positive electrode active material (Japanese Laid-Open Patent Publication No. 8-17468/1996).

As a result of examination made by the present inventors, however, it has been found that the charge-discharge cycle performance, at a high temperature of approximately 50 through 60° C. in particular, cannot be largely improved by using both $LiPF_6$ and $LIBF_4$. This is probably because P—F bonds and B—F bonds with low bonding strength are cut through repeated charge and discharge, resulting in releasing fluorine ions degrading the charge-discharge cycle performance or lowering the concentration of the electrolytic salt in the nonaqueous electrolyte.

Accordingly, an object of the invention is providing a lithium secondary battery exhibiting better charge-discharge cycle performance than a lithium secondary battery using a conventional nonaqueous electrolyte. This object is achieved by using a specific lithium salt as the electrolytic salt of the nonaqueous electrolyte as described in detail below.

SUMMARY OF THE INVENTION

The lithium secondary battery of this invention (present battery) comprises a positive electrode, a negative electrode and a nonaqueous electrolyte including an electrolytic salt dissolved in a nonaqueous solvent, and a part or whole of the electrolytic salt is lithium tetrakis(pentafluorophenyl)borate.

As a result, the present battery can exhibit better charge-discharge cycle performance than a lithium secondary battery using a conventional nonaqueous electrolyte.

BRIEF DESCRIPTION OF THE DRAWING

A more complete appreciation of the invention and many of the attendant advantages thereof will be readily obtained as the same become better understood by reference to the following detailed description when considered in connection with the accompanying drawing, wherein:

FIGURE is a perspective view of a card type lithium secondary battery fabricated in an embodiment.

DETAILED DESCRIPTION OF THE INVENTION

In the present battery, a part or whole of the electrolytic salt is lithium tetrakis(pentafluorophenyl)borate (hereinafter expressed as "$LiB(C_6F_5)_4$"). Therefore, the present battery can exhibit better charge-discharge cycle performance, at a high temperature in particular, than a battery using a conventional lithium salt such as $LiPF_6$, $LiBF_4$, $LiCF_3SO_3$, $LiN(CF_3SO_2)_2$ and $LiN(C_2F_5SO_2)_2$. Moreover, the present battery can exhibit better charge-discharge cycle performance at a high temperature than a battery using both $LiPF_6$ and $LiBF_4$ as the electrolytic salt. This is probably for the following reasons: (1) Since $LiB(C_6F_5)_4$ does not include a B—F bond and the like with low bonding strength, anions ($[B(C_6F_5)_4]^-$) are minimally decomposed even if charge-discharge cycles are repeated at a high temperature; and (2) giant anions coordinated on the surface of a negative electrode active material form a stable coat film, and the coat film effectively prevents the negative electrode active material from peeling off and releasing from the negative electrode and suppresses the nonaqueous solvent from degrading through decomposition on the surface of the negative electrode.

The total concentration of the electrolytic salt is preferably 0.5 through 1.6 mol/liter and more preferably 0.7 through 1.5 mol/liter in this invention. The present battery uses $LiB(C_6F_5)_4$ as a part or whole of the electrolytic salt. The concentration of $LiB(C_6F_5)_4$ is preferably 0.01 through 1.5 mol/liter. When the concentration of $LiB(C_6F_5)_4$ is out of this range, the charge-discharge cycle performance tends to degrade.

Examples of another electrolytic salt used when a part of the electrolytic salt is $LiB(C_6F_5)_4$ are $LIPF_6$, $LiBF_4$, $LiCF_3SO_3$, $LiN(CF_3SO_2)_2$ and $LiN(C_2F_5SO_2)_2$, among which $LiPF_6$ is particularly preferred. The present battery attains further better charge-discharge cycle performance by using $LiB(C_6F_5)_4$ together with $LiPF_6$ than by singly using $LiB(C_6F_5)_4$. The molar ratio between $LiB(C_6F_5)_4$ and $LiPF_6$ used together is preferably 1:9 through 98:2.

Examples of the nonaqueous solvent are ethylene carbonate, propylene carbonate, vinylene carbonate, 1,2-butylene carbonate, 2,3-butylene carbonate, tetrahydrofuran, γ-butyrolactone, dimethyl carbonate, diethyl carbonate, ethylmethyl carbonate, methylpropyl carbonate, methylisopropyl carbonate, dimethoxyethane and diethoxyethane. Two or more of these nonaqueous solvents can be used together if necessary. Furthermore, the nonaqueous electrolyte may be any of phosphazenes such as an oligoethylene polyphosphazene polymer. The nonaqueous solvent is preferably a mixed solvent including diethyl ether. When the nonaqueous solvent includes diethyl ether, the resultant lithium secondary battery can attain very good charge-discharge cycle performance. The reason is not obvious but probably because diethyl ether has a function to stabilize the anions ($[B(C_6F_5)_4]^-$) in the nonaqueous electrolyte so as to suppress the anions from degrading through decomposition during charge-discharge cycles. An example of the mixed solvent including diethyl ether is a mixed solvent including ethylene carbonate, diethyl carbonate and/or ethylmethyl carbonate, and diethyl ether. The concentration of diethyl ether in this mixed solvent is preferably 0.1 through 4.5 vol %.

The present invention is characterized by use of the specific nonaqueous electrolyte. Accordingly, the other members of the battery such as the positive electrode and the negative electrode are not particularly specified and can be made from any of conventionally known materials.

Examples of the positive electrode active material are a transition metal oxide such as $LiCoO_2$, $LiNiO_2$, $LiMn_2O_4$, $LiCo_{0.5}Ni_{0.3}Mn_{0.2}O_2$, $LiMnO_2$ and $MnO_2$ and a metal sulfide. Examples of the negative electrode active material are a substance capable of occluding and discharging lithium ions such as a metal oxide like $SnO_2$, $SnO$, $TiO_2$, $Nb_2O_5$, a metal sulfide, lithium alloy and a carbon material, and metallic lithium. In order to obtain a lithium secondary battery exhibiting very good charge-discharge cycle performance at a high temperature, a carbon material with a lattice spacing $d_{002}$ between lattice planes (002) of 3.35 through 3.38 Å is particularly preferably used as the negative electrode active material.

Embodiments

Other features of the invention will become more apparent in the course of the following descriptions of exemplary embodiments which are given for illustration of the invention and not intended to be limiting thereof.

Experiment 1

A present battery and comparative batteries were fabricated so as to compare their charge-discharge cycle performance.

Embodiment 1

Preparation of Positive Electrode

A mixture including $LiCoO_2$ serving as a positive electrode active material, artificial graphite serving as a conductive agent and PVcIF (poly(vinylidene fluoride)) serving as a binder in a weight ratio of 80:10:10 was mixed with NMP (N-methyl-2-pyrrolidone) to give a slurry. The slurry was applied on one surface of an aluminum foil with a thickness of 20 μm serving as a collector by a doctor blade method, and was dried under vacuum at 120° C. for 2 hours. The resultant was cut into a rectangular shape of 3.5 cm×6.5 cm and provided with a positive electrode tab. Thus, a positive electrode was prepared.

Preparation of Negative Electrode

A mixture including a graphite powder (with a lattice spacing $d_{002}$ between lattice planes (002) of 3.35 Å and an Lc, a crystallite size in the c-axis direction, of 1000 Å or more) and PVdF serving as a binder in a weight ratio of 90:10 was mixed with NMP to give a slurry. The slurry was applied on one surface of a copper foil with a thickness of 20 μm serving as a collector by the doctor blade method, and was dried under vacuum at 120° C. for 2 hours. The resultant was cut into a rectangular shape of 4 cm×7 cm and provided with a negative electrode tab. Thus, a negative electrode was prepared.

Preparation of Nonaguepus Electrolyte

A nonaqueous electrolyte was prepared by dissolving 1.0 mol/liter of $LiB(C_6F_5)_4$ in a mixed solvent including ethylene carbonate and diethyl carbonate in a volume ratio of 40:60.

Fabrication of Lithium Secondary Battery

An electrode body was fabricated by placing the positive electrode on the negative electrode with a polyethylene film (with a size of 4.5 cm×7.5 cm) serving as a separator sandwiched therebetween. The nonaqueous electrolyte was injected into the separator, and the entire electrode body excluding the positive electrode tab and the negative electrode tab was wrapped with a laminate film of aluminum and polypropylene (battery housing member). Thus, a card type lithium secondary battery ([]present battery) A1 was fabricated. FIGURE is a perspective view of the present battery A1 thus fabricated, wherein a reference numeral 1 denotes the laminate film and reference numerals 2 and 3 denote the positive electrode tab and the negative electrode tab, respectively.

COMPARATIVE EXAMPLES 1 THROUGH 6

Comparative batteries X1 through X6 were fabricated in the same manner as in Embodiment 1 except that 1.0 mol/liter of $LiB(C_6F_5)_4$ dissolved in the preparation of the nonaqueous electrolyte was replaced with 1.0 mol/liter of $LiPF_6$, $LiBF_4$, $LiCF_3SO_3$, $LiN(CF_3SO_2)_2$, $LiN(C_2F_5SO_2)_2$ or a mixture including $LiPF_6$ and $LiBF_4$ in a molar ratio of 4:1.

Charge-Discharge Cycle Test

With respect to each of the batteries, 100 charge-discharge cycles were run in each cycle of which the battery was charged with 5 mA to 4.1 V and discharged with 5 mA to 2.7 V at 60° C., so as to obtain a capacity retention ratio at the 100th cycle defined by a formula below. The results are shown in Table 1.

Capacity retention ratio (%) =(Discharge capacity at 100th cycle/ Discharge capacity at 1st cycle) =100

TABLE 1

| Battery | Electrolytic salt | Capacity retention ratio (%) |
| --- | --- | --- |
| A1 | 1.0 M $LiB(C_6F_5)_4$ | 85 |
| X1 | 1.0 M $LiPF_6$ | 71 |
| X2 | 1.0 M $LiBF_4$ | 66 |
| X3 | 1.0 M $LiCF_3SO_3$ | 14 |
| X4 | 1.0 M $LiN(CF_3SO_2)_2$ | 21 |
| X5 | 1.0 M $LiN(C_2F_5SO_2)_2$ | 52 |
| X6 | 0.8 M $LiPF_6$ + 0.2 M $LIBF_4$ | 73 |

It is understood from Table 1 that the present battery A1 using $LiB(C_6F_5)_4$ as the electrolytic salt can exhibit better charge-discharge cycle performance at a high temperature than the comparative batteries X1 through X6 each using the conventional lithium salt as the electrolytic salt.

Experiment 2

A preferred concentration of $LiB(C_6F_5)_4$ singly used as the electrolytic salt was examined as follows:

Present batteries B1 through B4 were fabricated in the same manner as in Embodiment 1 except that 1.0 mol/liter of $LiB(C_6F_5)_4$ dissolved in the preparation of the nonaqueous electrolyte was replaced with 1.6 mol/liter, 1.5 mol/liter, 0.7 mol/liter or 0.5 mol/liter of $LiB(C_6F_5)_4$.

Each of the batteries was subjected to the charge-discharge cycle test under the same conditions as in Experiment 1 so as to obtain the capacity retention ratio at the 100th cycle. The results are shown in Table 2. Table 2 also shows the capacity retention ratio of the present battery A1 listed in Table 1.

TABLE 2

| Battery | Electrolytic salt | Capacity retention ratio (%) |
|---|---|---|
| B1 | 1.6 M LiB($C_6F_5$)$_4$ | 79 |
| B2 | 1.5 M LiB($C_6F_5$)$_4$ | 84 |
| A1 | 1.0 M LiB($C_6F_5$)$_4$ | 85 |
| B3 | 0.7 M LiB($C_6F_5$)$_4$ | 82 |
| B4 | 0.5 M LiB($C_6F_5$)$_4$ | 80 |

It is understood from Table 2 that the concentration of LiB($C_6F_5$)$_4$ singly used as the electrolytic salt is preferably 1.5 mol/liter or less.

Experiment 3

A conventional lithium salt to be preferably used together with LiB($C_6F_5$)$_4$ was examined as follows:

Present batteries C1 through C5 were fabricated in the same manner as in Embodiment 1 except that 1.0 mol/liter of LiB($C_6F_5$)$_4$ dissolved in the preparation of the nonaqueous electrolyte was replaced with 0.5 mol/liter of LiB($C_6F_5$)$_4$ and 0.5 mol/liter of LiPF$_6$, LiBF$_4$, LiCF$_3$SO$_3$, LiN(CF$_3$SO$_2$)$_2$ or LiN($C_2F_5$SO$_2$)$_2$.

Each of the batteries was subjected to the charge-discharge cycle test under the same conditions as in Experiment 1 so as to obtain the capacity retention ratio at the 100th cycle. The results are shown in Table 3.

TABLE 3

| Battery | Electrolytic salt used with LiB($C_6F_5$)$_4$ | Capacity retention ratio (%) |
|---|---|---|
| C1 | LiPF$_6$ | 91 |
| C2 | LiBF$_4$ | 85 |
| C3 | LiCF$_3$SO$_3$ | 81 |
| C4 | LiN(CF$_3$SO$_2$)$_2$ | 83 |
| C5 | LiN($C_2F_5$SO$_2$)$_2$ | 84 |

As is shown in Table 3, all of the present batteries C1 through C5 can exhibit better charge-discharge cycle performance than the comparative batteries X1 through X6 respectively using the conventional lithium salts listed in Table 1. In particular, the present battery C1 exhibits better charge-discharge cycle performance than the present battery A1 listed in Table 1. This reveals that LiPF$_6$ is preferably used together with LiB($C_6F_5$)$_4$ as the electrolytic salt.

Experiment 4

Since it was found in Experiment 3 that LiPF$_6$ is preferably used together with LiB($C_6F_5$)$_4$, a preferable proportion therebetween was examined in Experiment 4.

Present batteries D1 through D8 were fabricated in the same manner as in Embodiment 1 except that 1.0 mol/liter of LiB($C_6F_5$)$_4$ dissolved in the preparation of the nonaqueous electrolyte was replaced with a combination of LiB($C_6F_5$)$_4$ and LiPF$_6$ in a proportion of 0.99 mol/liter and 0.01 mol/liter; 0.98 mol/liter and 0.02 mol/liter; 0.95 mol/liter and 0.05 mol/liter; 0.10 mol/liter and 0.90 mol/liter; 0.05 mol/liter and 0.95 mol/liter; 0.02 mol/liter and 0.98 mol/liter; 0.01 mol/liter and 0.99 mol/liter; or 0.005 mol/liter and 0.995 mol/liter.

Each of the batteries was subjected to the charge-discharge cycle test under the same conditions as in Experiment 1 so as to obtain the capacity retention ratio at the 100th cycle. The results are shown in Table 4. Table 4 also shows the capacity retention ratio of the present battery C1 listed in Table 3.

TABLE 4

| Battery | Electrolytic salt | Capacity retention ratio (%) |
|---|---|---|
| D1 | 0.99M LiB($C_6F_5$)$_4$ + 0.01 M LiPF$_6$ | 85 |
| D2 | 0.98M LiB($C_6F_5$)$_4$ + 0.02 M LiPF$_6$ | 89 |
| D3 | 0.95M LiB($C_6F_5$)$_4$ + 0.05 M LiPF$_6$ | 90 |
| C1 | 0.50M LiB($C_6F_5$)$_4$ + 0.50 M LiPF$_6$ | 91 |
| D4 | 0.10M LiB($C_6F_5$)$_4$ + 0.90 M LiPF$_6$ | 90 |
| D5 | 0.05M LiB($C_6F_5$)$_4$ + 0.95 M LiPF$_6$ | 86 |
| D6 | 0.02M LiB($C_6F_5$)$_4$ + 0.98 M LiPF$_6$ | 86 |
| D7 | 0.01M LiB($C_6F_5$)$_4$ + 0.99 M LiPF$_6$ | 82 |
| D8 | 0.005M LiB($C_6F_5$)$_4$ + 0.995 M LiPF$_6$ | 79 |

As is understood from Table 4, the charge-discharge cycle performance is particularly good in the present batteries C1 and D2 though D4. This reveals that the preferable molar ratio between LiB($C_6F_5$)$_4$ and LiPF$_6$ used together as the electrolytic salt is 1:9 through 98:2. Furthermore, the charge-discharge cycle performance is comparatively poor in the present battery D8 including 0.005 mol/liter of LiB($C_6F_5$)$_4$ as in the present battery B1 including 1.6 mol/liter of LiB($C_6F_5$)$_4$ listed in Table 2. It is understood from this fact and the results of Experiment 2 that the concentration of LiB($C_6F_5$)$_4$ is preferably 0.01 through 1.5 mol/liter.

Experiment 5

It is understood from comparison between the present battery C1 listed in Table 3 and the present battery A1 and the comparative battery X1 listed in Table 1 that the charge-discharge cycle performance can be largely improved by using LiB($C_6F_5$)$_4$ together with LiPF$_6$. All of the present batteries C1 and A1 and the comparative battery X1 use graphite as the negative electrode active material. Accordingly, the effect of using LiB($C_6F_5$)$_4$ and LiPF$_6$ together was examined in a battery using a negative electrode active material other than graphite in Experiment 5.

Present batteries E1 through E3 were fabricated in the same manner as in Embodiment 1 except that the graphite powder was replaced with coke ($d_{002}$=3.47 Å; and Lc =38 Å), metallic lithium or lithium-aluminum alloy in the preparation of the negative electrode and that 1.0 mol/liter of LiB($C_6F_5$)$_4$ dissolved in the preparation of the nonaqueous electrolyte was replaced with 0.50 mol/liter of LiB($C_6F_5$)$_4$ and 0.50 mol/liter of LiPF$_6$. Furthermore, comparative batteries Y1 through Y3 were fabricated in the same manner as in Embodiment 1 except that the graphite powder was replaced with coke ($d_{002}$=3.47 Å; and Lc=38 Å), metallic lithium or lithium-aluminum alloy in the preparation of the negative electrode and that 1.0 mol/liter of LiB($C_6F_5$)$_4$ dissolved in the preparation of the nonaqueous electrolyte was replaced with 1.0 mol/liter of LiPF$_6$. In each of the present battery E2 and the comparative battery Y2, the negative electrode was fabricated by adhering metallic lithium under pressure onto meshes of stainless steel (SUS304) serving as a substrate. Also, in each of the present battery E3 and the comparative battery Y3, the negative electrode was prepared as follows: A lithium electrode obtained by adhering metallic lithium under pressure onto meshes of stainless steel (SUS304) serving as a substrate was placed on an aluminum foil, and the resultant was immersed in a nonaqueous electrolyte having the same composition as the nonaqueous electrolyte used in the battery for 12 hours so as to change the metallic lithium into lithium-aluminum alloy.

Each of the batteries was subjected to the charge-discharge cycle test under the same conditions as in Experiment 1 so as to obtain the capacity retention ratio at the 100th cycle. The results are shown in Table 5. Table 5 also shows the capacity retention ratios of the present battery C1 and the comparative battery X1 respectively listed in Tables 3 and 1.

preference proportion of diethyl ether in a mixed solvent including ethylene carbonate, diethyl carbonate and diethyl ether was examined in Experiment 7.

TABLE 5

| Battery | Negative electrode active material | Electrolytic salt | Capacity retention ratio (%) |
|---|---|---|---|
| C1 | graphite | 0.50 M LiB($C_6F_5$)$_4$ + 0.50 M LiPF$_6$ | 91 |
| X1 | graphite | 1.0 M LiPF$_6$ | 71 |
| E1 | coke | 0.50 M LiB($C_6F_5$)$_4$ + 0.50 M LiPF$_6$ | 79 |
| Y1 | coke | 1.0 M LiPF$_6$ | 70 |
| E2 | metallic Li | 0.50 M LiB($C_6F_5$)$_4$ + 0.50 M LiPF$_6$ | 47 |
| Y2 | metallic Li | 1.0 M LiPF$_6$ | 0 |
| E3 | Li—Al alloy | 0.50 M LiB($C_6F_5$)$_4$ + 0.50 M LiPF$_6$ | 80 |
| Y3 | Li—Al alloy | 1.0 M LiPF$_6$ | 28 |

As is shown in Table 5, the capacity retention ratio is much higher and the charge-discharge cycle performance is much better in the present batteries E1 through E3 than in the comparative batteries Y1 through Y3, respectively. It is understood from these results that the charge-discharge cycle performance can be largely improved by using LiB($C_6F_5$)$_4$ together with LiPF$_6$ as the electrolytic salt regardless of the kind of negative electrode active material.

Experiment 6

A variety of ethers were used as a part of the nonaqueous solvent so as to compare the resultant charge-discharge cycle performance.

Present batteries F1 through F3 were fabricated in the same manner as in Embodiment 1 except that, in the preparation of the nonaqueous electrolyte, the mixed solvent including ethylene carbonate and diethyl carbonate in a volume ratio of 40:60 was replaced with a mixed solvent including ethylene carbonate, diethyl carbonate and diethyl ether in a volume ratio of 40:59.5:0.5, a mixed solvent including ethylene carbonate, diethyl carbonate and dimethoxyethane in a volume ratio of 40:59.5:0.5 or a mixed solvent including ethylene carbonate, diethyl carbonate and diethoxyethane in a volume ratio of 40:59.5:0.5, and that 1.0 mol/liter of LiB($C_6F_5$)$_4$ was replaced with 0.50 mol/liter of LiB($C_6F_5$)$_4$ and 0.50 mol/liter of LiPF$_6$.

Each of the batteries was subjected to the charge-discharge cycle test under the same conditions as in Experiment 1 so as to obtain the capacity retention ratio at the 100th cycle. The results are shown in Table 6. Table 6 also shows the capacity retention ratio of the present battery C1 listed in Table 3.

TABLE 6

| Battery | Composition of solvent (volume ratio) | Capacity retention ratio (%) |
|---|---|---|
| C1 | EC:DEC = 40:60 | 91 |
| F1 | EC:DEC:diethyl ether = 40:59.5:0.5 | 93 |
| F2 | EC:DEC:dimethoxyethane = 40:59.5:0.5 | 89 |
| F3 | EC:DEC:diethoxyethane = 40:59.5:0.5 | 88 | notes: EC = ethylene carbonate, DEC = diethyl carbonate

As is shown in Table 6, the capacity retention ratio is higher in the present battery F1 than in the present battery C1. This reveals that the lithium secondary battery can exhibit very good charge-discharge cycle performance when diethyl ether is used as a part of the nonaqueous solvent.

Experiment 7

Since it was found in Experiment 6 that diethyl ether is preferably used as a part of the nonaqueous solvent, a Present batteries G1 through G5 were fabricated in the same manner as in Embodiment 1 except that, in the preparation of the nonaqueous electrolyte, the mixed solvent including ethylene carbonate and diethyl carbonate in a volume ratio of 40:60 was replaced with a mixed solvent including ethylene carbonate diethyl carbonate and diethyl ether in a volume ratio of 40:59.95:0.05, 40:59.9:0.1, 40:59:1, 40:55.5:4.5 or 40:55:5, and that 1.0 mol/liter of LiB($C_6F_5$)$_4$ was replaced with 0.50 mol/liter of LiB($C_6F_5$)$_4$ and 0.50 mol/liter of LiPF$_6$.

Furthermore, present batteries H1 through H4 were fabricated in the same manner as in Embodiment 1 except that, in the preparation of the nonaqueous electrolyte, the mixed solvent including ethylene carbonate and diethyl carbonate in a volume ratio of 40:60 was replaced with a mixed solvent including ethylene carbonate, diethyl carbonate and diethyl ether in a volume ratio of 50:49.95:0.05, 50:49.9:0.1, 50:45.5:4.5 or 50:45:5, and that 1.0 mol/liter of LiB($C_6F_5$)$_4$ was replaced with 0.50 mol/liter of LiB($C_6F_5$)$_4$ and 0.50 mol/liter LiPF$_6$.

In addition, present batteries K1 through K4 were fabricated in the same manner as in Embodiment 1 except that, in the preparation of the nonaqueous electrolyte, the mixed solvent including ethylene carbonate and diethyl carbonate in a volume ratio of 40:60 was replaced with a mixed solvent including ethylene carbonate, ethylmethyl carbonate and diethyl ether in a volume ratio of 40:59.95:0.05, 40:59.9:0.1, 40:55.5:4.5 or 40:55:5, and that 1.0 mol/liter of LiB($C_6F_5$)$_4$ was replaced with 0.50 mol/liter of LiB($C_6F_5$)$_4$ and 0.50 mol/liter of LiPF$_6$.

Each of the batteries was subjected to the charge-discharge cycle test under the same conditions as in Experiment 1 so as to obtain the capacity retention ratio at the 100th cycle. The results are shown in Table 7. Table 7 also shows the capacity retention ratios of the present batteries C1 and F1 respectively listed in Tables 3 and 6.

TABLE 7

| Battery | Composition of solvent (volume ratio) | Capacity retention ratio (%) |
|---|---|---|
| C1 | EC:DEC = 40:60 | 91 |
| G1 | EC:DEC:diethyl ether = 40:59.95:0.05 | 91 |
| G2 | EC:DEC:diethyl ether = 40:59.9:0.1 | 93 |
| F1 | EC:DEC:diethyl ether = 40:59.5:0.5 | 93 |
| G3 | EC:DEC:diethyl ether = 40:59:1 | 93 |
| G4 | EC:DEC:diethyl ether = 40:55.5:4.5 | 93 |
| G5 | EC:DEC:diethyl ether = 40:55:5 | 90 |
| H1 | EC:DEC:diethyl ether = 30:69.95:0.05 | 91 |

TABLE 7-continued

| Battery | Composition of solvent (volume ratio) | Capacity retention ratio (%) |
|---|---|---|
| H2 | EC:DEC:diethyl ether = 30:69.9:0.1 | 93 |
| H3 | EC:DEC:diethyl ether = 30:65.5:4.5 | 94 |
| H4 | EC:DEC:diethyl ether = 30:65:5 | 90 |
| J1 | EC:DEC:diethyl ether = 50:49.95:0.05 | 91 |
| J2 | EC:DEC:diethyl ether = 50:49.9:0.1 | 93 |
| J3 | EC:DEC:diethyl ether = 50:45.5:4.5 | 94 |
| J4 | EC:DEC:diethyl ether = 50:45:5 | 90 |
| K1 | EC:EMC:diethyl ether = 40:59.95:0.05 | 90 |
| K2 | EC:EMC:diethyl ether = 40:59.9:0.1 | 93 |
| K3 | EC:EMC:diethyl ether = 40:55.5:4.5 | 93 |
| K4 | EC:EMC:diethyl ether = 40:55:5 | 90 | notes: EC = ethylene carbonate, DEC = diethyl carbonate
EMC = ethylmethyl carbonate As is shown in Table 7, among the present batteries C1, F1 and G1 through G5, the capacity retention ratio is particularly high and the charge-discharge cycle performance is particularly good in the present batteries F1 and G2 through G4. This reveals that the proportion of diethyl ether in a mixed solvent including ethylene carbonate, diethyl carbonate and diethyl ether used as the nonaqueous solvent is preferably 0.1 through 4.5 vol %.

Furthermore, among the present batteries H1 through H4, the charge-discharge cycle performance is particularly good in the present batteries H2 and H3, among the present batteries J1 through J4, the charge-discharge cycle performance is particularly good in the present batteries J2 and J3, and among the present batteries K1 through K4, the charge-discharge cycle performance is particularly good in the present batteries K2 and K3. Accordingly, it is understood that the proportion of diethyl ether in a mixed solvent is preferably 0.1 through 4.5 vol % regardless of the proportion between ethylene carbonate and diethyl carbonate and diethyl carbonate or ethylmethyl carbonate.

Obviously, numerous modifications and variations of the present invention are possible in light of the above teachings. It is therefore to be understood that within the scope of the appended claims the invention may be practiced otherwise than as specifically described herein.

What is claimed is:

1. A lithium secondary battery comprising:
    a positive electrode,
    a negative electrode comprising a carbon material with a lattice spacing $d_{002}$ between planes (002) of 3.35 through 3.38 Å, and
    a nonaqueous electrolyte including an electrolytic salt dissolved in a nonaqueous solvent, wherein a part or whole of the electrolytic salt being lithium tetrakis (pentafluorophenyl) borate.

2. The lithium secondary battery according to claim 1, wherein the nonaqueous electrolyte includes 0.01 through 1.5 mol/liter of lithium trtrakis (pentafluorophenyl) borate.

3. The lithium secondary battery according to claim 1, wherein the electrolytic salt is made substantially from lithium trtrakis (pentafluorophenyl) borate and $LiPF_6$ (Lithium hexafluorophosphate).

4. The lithium secondary battery according to claim 3, wherein a molar ratio between lithium tetrakis (pentafluorophenyl) borate and $LiPF_6$ (lithium hexafluorophosphate) is 1:9 through 98:2.

5. The lithium secondary battery according to claim 1, wherein the nonaqueous solvent is mixed solvent including diethyl ether.

6. The lithium secondary battery according to claim 5, wherein the mixed solvent including diethyl ether is substantially a mixed solvent including ethylene carbonate, diethyl carbonate and/or ethylmethyl carbonate, and diethyl ether.

7. The lithium secondary battery according to claim 6, wherein diethyl ether is included in the mixed solvent in 0.1 through 4.5 vol %.

8. A lithium secondary battery comprising:
    a positive electrode,
    a negative electrode, and
    a nonaqueous electrolyte including and electrolytic salt dissolved in a nonaqueous solvent, wherein the electrolytic salt being made substantially from lithium tetrakis (pentafluoropheny) borate and lithium hexafluorophosphate.

9. The lithium secondary battery of claim 8, wherein the molar ratio between lithium tetrakis(pentafluorophenyl) borate and lithium hexafluorophosphate is 1:9 through 98:2.

10. The lithium secondary battery of claim 8, wherein the nonaqueous solvent is a mixed solvent comprising diethyl ether.

11. The lithium secondary battery of claim 10, wherein the mixed solvent comprising diethyl ether is substantially a mixed solvent including ethylene carbonate, diethyl carbonate and/or ethylmethyl carbonate, and diethyl ether.

12. The lithium secondary battery of claim 11, wherein diethyl ether is included in the mixed solvent in the amount of 0.1 to 4.5 vol %.

13. The lithium secondary battery of claim 1, wherein said nonaqueous electrolyte further comprises an electrolytic salt selected from the group consisting of $LiPF_6$, $LiBF_4$, $LiCF_3SO_3$, $LiN(CF_3SO_2)_2$ and $LiN(C_2F_5SO_2)_2$.

* * * * *

UNITED STATES PATENT AND TRADEMARK OFFICE
CERTIFICATE OF CORRECTION

PATENT NO. : 6,537,697 B2
DATED : March 25, 2003
INVENTOR(S) : Kida, Yoshinori et al.

It is certified that error appears in the above-identified patent and that said Letters Patent is hereby corrected as shown below:

Column 2,
Line 43, change from "LIPF$_6$" to -- LiPF$_6$ --

Column 10,
Line 49, change from "LIBF$_4$" to -- LiBF$_4$ --
Line 50, change from "LICF$_3$SO$_3$" to -- LiCF$_3$SO$_3$ --

Signed and Sealed this

Eighth Day of July, 2003

JAMES E. ROGAN
*Director of the United States Patent and Trademark Office*